(12) United States Patent  
Miyatani

(10) Patent No.: US 6,968,169 B2
(45) Date of Patent: Nov. 22, 2005

(54) RECEIVER

(75) Inventor: Tetsuhiko Miyatani, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 626 days.

(21) Appl. No.: 09/955,982

(22) Filed: Sep. 20, 2001

(65) Prior Publication Data

US 2002/0072343 A1 Jun. 13, 2002

(30) Foreign Application Priority Data

Dec. 7, 2000 (JP) ............................. 2000-372570

(51) Int. Cl.[7] ............................................. H04B 1/06
(52) U.S. Cl. ....................... 455/272; 455/134; 455/504; 370/335
(58) Field of Search ................................. 455/272, 424, 455/504, 134; 370/335, 342, 500; 375/147, 375/148

(56) References Cited

FOREIGN PATENT DOCUMENTS

| EP | 0806844 A1 | | 11/1997 | |
|----|------------|---|---------|---|
| GB | 2343817 A | | 5/2000 | |
| JP | 411055216 A | * | 2/1999 | .......... H04J 13/00 |
| JP | 411205286 A | * | 7/1999 | .......... H04J 13/04 |
| WO | 00/33481 | | 6/2000 | |
| WO | 00/35123 | | 6/2000 | |

* cited by examiner

Primary Examiner—Melur Ramakrishnaiah
(74) Attorney, Agent, or Firm—Wenderoth, Lind & Ponack, L.L.P.

(57) ABSTRACT

A receiver that uses multiple antennas to receive signals arriving over multiple paths and is configured for enhanced received signal path detection accuracy and improved reception quality includes a receive weight generating circuit that generates receive weights for every antenna based on signals received from the antennas, a summing circuit that calculates sums of results obtained by multiplying the signals from the antennas and the receive weights of the individual antennas generated by the receive weight generating circuit and path detection circuit that detects the paths of the received signals based on the sums calculated by the summing circuit.

8 Claims, 10 Drawing Sheets

# RECEIVER

BACKGROUND OF THE INVENTION

1. Field of the Invention

This invention relates to a receiver or the like that uses multiple antennas to receive signals arriving over multiple propagation paths, and particularly to a technology that improves reception quality by enhancing the accuracy of received signal path detection.

2. Description of the Prior Art

A receiver for wireless reception of direct sequence-code division multiple access (DS-CDMA) signals or other such spread-spectrum communication system signals generally demodulates the desired incoming waves by correlating the received signal with a spreading code at a timing synchronized with the desired incoming waves contained in the received signal. Therefore, in the CDMA system, for instance, the first processing step is to detect the timing of the desired incoming waves in the received signal.

Detection of incoming wave timing is customarily called path detection. Moreover, a signal from a transmitter may arrive at the receiver via multiple paths, in which case multiple paths exist for that particular signal.

In recent years, consideration has been given to CDMA transceiver circuits that utilize adaptive array antennas (AAAs). Such a CDMA transceiver circuit uses a CDMA system to transmit and receive signals over the airwaves utilizing an adaptive array antenna.

At the time of signal reception, the multiple antennas of the adaptive array antenna are generally weighted to adjust the receive directivity to enable maximum directivity in the direction of the desired incoming wave and strongly depress received signal quality with respect to signals from other directions. At the time of signal transmission, the multiple antennas of the adaptive array antenna are weighted to adjust the transmit directivity to enable maximum directivity in the desired direction and strongly depress transmit signal quality with respect to other directions.

FIG. 5 shows an example of receive directivity patterns of an adaptive array antenna. The pattern designated (a) is an example in which the maximum directivity has been adjusted to 0 degrees for reception of an incoming wave from the 0-degree direction, and the pattern designated (b) is an example in which the maximum directivity has been adjusted to 45 degrees for reception of an incoming wave from the 45-degree direction. For reference, the drawing also shows the directivity component in the 180-direction that is the opposite direction from 0 degree, and the −45-degree direction that is the opposite direction from 45 degrees.

When an adaptive array antenna capable of achieving this kind of directivity is used to receive and process signals, the desired signal can be received while eliminating interference entering the antenna owing to waves arriving from directions different from the arrival direction of the desired signal. The adaptive array antenna has therefore drawn considerable attention as a technology for eliminating interference waves received by the antenna owing to waves arriving from directions different from the arrival direction of the desired signal. The adaptive array antenna has therefore drawn considerable attention as a technology for eliminating interference.

FIG. 6 shows an example configuration of a receiver including a path detection circuit used in a conventional base station equipped with an adaptive array antenna.

The receiver comprises N number (a plural number) of receive paths composed of N number of antennas G1–GN constituting an adaptive array antenna, N number of receiver units (RX) H1–HN each associated with one of the antennas G1–GN, and N number of user separators I1–IN each associated with one of the antennas G1–GN (and one of the receiver units H1–HN). The illustrated receiver also includes a user-segregated AAA signal processor and discriminator 41 common to the N number of receive paths.

The illustrated receiver is further equipped with a path detection circuit composed of an antenna 42, receiver unit 43, spreading code generator 44, correlator 45, delay profile analyzer 46 and path detector 47.

Each of the N number of antennas G1–GN receives wireless signals.

Each of the N number of receiver units H1–HN down-converts the input signals from the associated antenna G1–GN from a carrier frequency band signal to a baseband signal and outputs the down-converted signal to the associated user separator I1–IN.

Although in the illustrated example the receiver units H1–HN down-convert the input signals from the antennas G1–GN to baseband signals and then output the baseband signals to the user separators I1–IN, other configurations are also usable.

The user separators I1–IN include multiple correlators (commonly referred to as "fingers") in a number equal to ({number of users (mobile stations)}×{number of paths per user}), which they use to separate the signals input from the associated receiver units H1–HN into signals of the individual users and individual paths. They then output the separated signals (user-separated signals) to the user-segregated AAA signal processor and discriminator 41.

FIG. 7 shows an example configuration of the correlators provided in the user separators I1–IN. The correlator is equipped with a user-segregated spreading code generator 51, complex multiplier 52, synthesizer (adder) 53, delay element 54 and switch 55.

An example of the operation of the illustrated correlator will be explained.

The user-segregated spreading code generator 51 generates a user-specific spreading code defined for each user and outputs the generated spreading code to the complex multiplier 52.

The complex multiplier 52 performs complex-multiplication on the spreading code from the user-segregated spreading code generator 51 and the signal from the associated receiver unit H1–HN every chip and outputs the result of the multiplication to the synthesizer 53.

The synthesizer 53 synthesizes (adds) the multiplication result for every chip input from the complex multiplier 52 and the output of the delay element 54 (explained later) and outputs the result of the synthesis.

The switch 55 is controlled by, for instance, a controller to open for one spreading code period of the user and to close when the period has elapsed. When the switch 55 is open, the synthesis result output by the synthesizer 53 is input to the delay element 54. When the switch 55 is closed, the synthesis result output by the synthesizer 53 is output through the switch 55 to the user-segregated AAA signal processor and discriminator 41.

The delay element 54 delays the synthesis result received from the synthesizer 53 by a prescribed time period and outputs it to the synthesizer 53. As a result, the multiplication results output by the complex multiplier 52 for a number of successive spreading code chips are cumulatively synthesized by the synthesizer 53 and the cumulative synthesis result is output through the switch 55 to the user-segregated AAA signal processor and discriminator 41. The cumulative synthesis results output through the switches 55 of the respective user separators I1–IN correspond to the result of correlating the signals output by the user separators I1–IN and the respective user spreading codes (despreading result) and thus correspond to signals separated by user and path.

The user-segregated AAA signal processor and discriminator 41 includes a user-segregated AAA signal processor and a discriminator.

The user-segregated AAA signal processor multiplies the user separated signals received from the user separators I1–IN and individual user receive weights (complex coefficients for weighting) and acquires the synthesized (summed) result of the multiplication results (in this example, N number of multiplication results based on the outputs from the antenna paths) as the adaptive array antenna receive result.

The discriminator discriminates the received data based on the synthesis result acquired by the user-segregated AAA signal processor and outputs the discriminated individual user data signals as demodulated signals (from the user-segregated AAA signal processor and discriminator 41).

The user-segregated AAA signal processor and discriminator 41 thus outputs the user data of each of M number (M being one or greater) of users.

The antenna 42 of the path detection circuit receives a wireless signal.

The receiver unit 43 of the path detection circuit down-converts the input signal from the antenna 42 from a carrier frequency band signal to a baseband signal and outputs the down-converted signal to the correlator 45. Although in the present example the receiver unit 43 down-converts the input signal from the antenna 42 to a baseband signal and the baseband signal is thereafter subjected to correlation processing in the correlator 45, other configurations are also usable.

The spreading code generator 44 generates user-specific spreading codes defined for the respective users and outputs the generated spreading codes to the correlator 45.

The correlator 45 correlates the signal received from the receiver unit 43 with the spreading code received from the spreading code generator 44 and outputs the correlation result to the delay profile analyzer 46.

A matched filter (MF) is generally used as the correlator 45. The matched filter is an infinite impulse response (FIR) filter. In the present example, its multiplication coefficient is the user-specific spreading code supplied by the spreading code generator 44.

FIG. 8 shows an example configuration of the correlator (MF) 45 and a spreading code generator 61 that corresponds to the spreading code generator 44 shown in FIG. 6. The correlator 45 comprises L number of series-connected shift registers J1–JL, L number of complex multipliers K1–KN each connected to the output of one of the shift registers J1–JL, and a synthesizer 62. L is equal to the number of chips contained in one spreading code.

The first shift register J1 receives the signal from the receiver unit 43 (e.g., an I signal or Q signal). It outputs the signal to the first complex multiplier K1 and, after a prescribed delay time, also outputs it to the second shift register J2.

Similarly, among the second to (L−1)th shift registers J2–JL−1, the ith (i= 2–L−1) shift register receives the signal output by the preceding shift register Ji−1, outputs the signal to the ith complex multiplier Ki and, after a prescribed delay time, also outputs it to the next shift register Ji+1.

The Lth shift register JL receives the signal output by the (L−1)th shift register JL−1 and outputs it to the Lth complex multiplier KL.

The spreading code generator 61 outputs L number of values (e.g., 1 and 0 values) corresponding to the L number of chips making up one spreading code to the complex multipliers K1–KL, using a bus line, for example.

The complex multipliers K1–KL perform complex multiplication on the signal values input from the shift registers J1–JL and the values input from the spreading code generator 61 and output the multiplication results to the synthesizer 62.

The synthesizer 62 synthesizes the L number of multiplication results received from the L number of complex multipliers K1–KL and outputs the synthesis result to the delay profile analyzer 46.

Operating in this manner, the correlator 45 successively correlates the received signals (their I or Q signals) from the antenna 42 with the spreading codes. When the spread spectrum signal contained in the received signal (its spreading code) and the spreading code output by the spreading code generator 44 (61) match in phase, a sharp autocorrelation peak peculiar to the spreading code appears in the output of the correlator 45.

Moreover, in the case where, for example, a delayed-wave path of the signal occurs in the propagation path in addition to the leading wave (direct wave) path of the signal, an autocorrelation peak of the delayed-wave appears in the output of the correlator 45 at a point shifted timewise from the leading wave autocorrelation peak by the delay time of the delayed-wave path.

FIG. 9 shows an example of the correlation result output by the correlator 45. Relative delay time is represented on the horizontal axis of the graph and the output level (receive level) of the correlation result on the vertical axis. The graph shows a case in which two propagation paths are present and the noise level Eb/N0=100 db.

The correlation result shown by the graph indicates the delay profile of the propagation path. Specifically, in this example, one delayed-wave has occurred relative to the leading wave in the propagation path and, as a result, two autocorrelation peaks have appeared.

A case in which noise and interference were reduced to the lowest possible level (Eb/N0=100 db) was taken as an example here in order to simplify the state of the propagation path. Actually, however, the autocorrelation peaks are buried in noise and interference. In the example under discussion, the buried state of the autocorrelation peaks is mitigated, as explained later, by having the delay profile analyzer 46 average the output of the correlator 45 over a long interval (long time period)

In other words, a time-averaged delay profile acquired by causing the delay profile analyzer 46 to average the correlation result received from the correlator 45 over time is output to the path detector 47.

FIG. 10 shows an example of cumulatively summed and averaged output of the correlator 45 (averaged data) and an example of a threshold Q explained below. The horizontal axis of the graph represents relative delay time and the vertical axis averaged data P and threshold Q.

As shown in FIG. 10, the path detector 47 sets an appropriate threshold Q with respect to the averaged delay profile received from the delay profile analyzer 46. Paths and noise are distinguished by defining averaged data P portions exceeding the threshold Q as autocorrelation peaks and defining averaged data portions equal to or lower than the threshold Q as noise portions. This enables detection of the path arrival times (leading wave and delayed-wave arrival times).

The so-detected path arrival times are, for example, imparted to the correlators (fingers) in the user separators I1–IN. The correlators can therefore generate spreading codes synchronously with the path arrival times and use them to carry out the correlation processing. The generation of the spreading codes with such timing establishes synchronization that constantly enables maximum value autocorrelation peaks of the desired incoming waves to be acquired in the correlation processing.

However, the detection circuit of a conventional CDMA receiver equipped with an adaptive array antenna, of which the CDMA receiver illustrated in FIG. 6 is one example, has a drawback in that the path detection accuracy in the path detector 47 is low because no adaptive array antenna processing is applied in the path detection.

This drawback will be explained.

In the CDMA system, for example, transmission power control is conducted that makes it possible to reduce the transmission power required to communicate with a receiver using an adaptive array antenna and capable of interference level reduction (compared with the case of not using an adaptive array antenna). In other words, the receiver can enhance the received signal quality by using the adaptive array antenna to receive and process the signal. However, the path detector 47 is not equipped with an adaptive array antenna. This not only prevents improvement of the path detection accuracy but also leads to degraded path detection accuracy when the transmission power is reduced.

Thus, the conventional receiver would be able utilize the adaptive array antenna to enable reduction of transmission power on the transmission side if the detection of path timing were as accurate as it might be. In fact, however, when the transmission power is reduced, the accuracy of path detection decreases to the point that the timing of autocorrelation peaks cannot be accurately detected. This makes it impossible to lower the transmission power.

To say that the transmission power cannot be reduced is the same as saying that the transmission power per user increases. In other words, in the CDMA system, which views signal power from users other than the desired user as interference power, the maximum number of mobile stations (users) that a base station can accommodate (the base station capacity) decreases. This is a serious problem.

Since the conventional CDMA system utilizing the adaptive array antenna thus requires high transmission power to prevent degradation of path detection accuracy, it therefore has the drawback of small system capacity. That is, the enhanced demodulation accuracy of a system utilizing the adaptive array antenna as a rule enables lowering of the transmission power on the transmission side, but reduction of the transmission power lowers the signal-to-noise ratio (SNR) of the conventional receiver described in the foregoing with respect to the received signal and makes it incapable of accurate path detection. Reduction of transmission power is therefore impossible.

A conventional technology related to path detection will be explained.

In a paper titled "Proposed CDMA path search method using an antenna synthesized delay profile" (Collected Papers for Presentation at 1999 Conference of Communications Society, The Institute of Electronics, Information and Communication Engineers B-5-39), Aoyama, Yoshida and Atokawa propose a path search method for path detection in a CDMA receiver that conducts RAKE receive. The method achieves high-speed, high-accuracy path detection by detecting path timing common to every antenna based on a synthesized delay profile that is the result of synthesizing the individual delay profiles of multiple diversity antennas. Unlike the present invention, however, the proposed method does not utilize the weights the individual antennas.

On the other hand, in a paper titled "Path search method suitable for a W-CDMA system using an adaptive array antenna" (Collected Papers for Presentation at 2000 Conference of The Institute of Electronics, Information and Communication Engineers B-5-53), Jitsukawa, Tsutsui and Tanaka propose a path search method that enhances path detection accuracy by generating a voltage profile for every antenna element making up the adaptive array antenna (i.e., in essence detecting the path for each antenna), estimating the phases of the multiple voltage profiles, and conducting the search using a delay profile obtained by in-phase synthesis of the multiple voltage profiles. (This paper will hereinafter be called "Reference A"). Unlike the present invention, however, the proposed method requires a large-scale physical (circuit) configuration because it has to separately calculate voltage profile for all of the multiple antennas and therefore needs multiple voltage profile calculating sections for this purpose.

The present invention was accomplished in light of the foregoing circumstances and has as an object to provide a receiver, CDMA receiver and CDMA base station that enhance received signal path detection accuracy when receiving a signal arriving via multiple paths using multiple antennas.

Another object the present invention is to provide a path detector and a path detection method that enhance received signal path detection accuracy.

SUMMARY OF THE INVENTION

The present invention achieves the foregoing objects by providing a receiver that, when receiving signals arriving via multiple paths using multiple antennas, detects the paths of the received signals in the following manner.

Specifically, in this invention receive weight generating means generates receive weights for every antenna based on signals received from the antennas, summing means calculates the sums of the results obtained by multiplying the signals from the antennas and the receive weights of the individual antennas generated by the receive weight generating means, and path detection means detects the paths of the received signals based on the sums calculated by the summing means.

Therefore, since the paths of the received signals are detected based on the sum of the results obtained by multiplying the signals from the antennas and the receive weights of the individual antennas, the invention amounts to applying adaptive array antenna technology to path detection and, as such, enhances received signal path detection accuracy and improves reception quality.

Unlike the path detection method proposed by Reference A, this invention does not generate a voltage profile for every antenna but instead calculates the sum of the results obtained by multiplying the signals from the antennas and the receive weights of the individual antennas and then detects the paths of the received signals based on the sum. Because of this, there is no need to calculate voltage profiles for the individual antennas and accordingly no need to provide a voltage profile calculating section for every antenna. This means that the physical configuration can be made small as compared with the path detection method proposed in Reference A, for example.

Any of various types of antennas can be used. In addition, various numbers of the antennas are usable and any of various antenna array configurations can be used.

As for the receive weights of the respective antennas, the receive weights calculated for receive-processing involving weighting and synthesis of the received signals from the respective antennas (i.e., for receive processing using an adaptive array antenna) are preferably also used for path detection.

Moreover, in the receiver according to this invention, the receive weight generating means generates receive weights for each of multiple paths, the summing means calculates a sum for each of the multiple receive weights, and the path detection means detects the paths of the received signals based on the multiple sums calculated by the summing means.

Therefore, since the results obtained by multiplying the signals from the antennas and the receive weights of the individual antennas, for every receive weight of multiple receive weights, are summed and the paths of the received signal are detected based on the multiple sums, the accuracy of received signal path detection is further enhanced.

It should be noted that the receive weights generated by the receive weight generating means generally differ between different paths.

The number of paths for which receive weights are generated by the receive weight generating means can be any of various numbers greater than one.

Any of various modes of detecting the received signal paths based on the multiple sums can be used. For example, there can be adopted a mode in which the paths of the received signals are detected based on one member selected from among the sum of the leading wave path, the sum of the highest level path, the sum of the lowest level path, and the sum calculated with the average of the receive weights of all paths (averaged receive weights). A mode in which the paths of the received signals are detected based on two or more of said members can also be adopted.

The receiver of the present invention can be configured such that the summing means calculates two or more members among the sum of the leading wave path, the sum of the highest level path, the sum of the lowest level path, and the sum calculated with the average of the receive weights of all paths, and the path detection means detects the paths of the received signals for every sum produced by the summing means, selects one of the sums produced by the summing means based on a comparison of the detected number of paths and the detected path levels with prescribed conditions relating to these, and detects the received signal paths based on the selected sum.

Any two or more members can be selected for use from among the sum of the leading wave path, the sum of the highest level path, the sum of the lowest level path, and the sum calculated with the average of the receive weights of all paths.

The conditions relating to the number of detected paths and their path levels can be any of various conditions. For instance, a detected path number threshold and a detected path level threshold can be used as the conditions. In this case, it is possible to select the sum produced by the summing means for which the detected number of paths and/or the detected path levels become equal to or greater than these thresholds.

Methods that can be adopted in the path detection means for selecting one of the sums produced by the summing means include that of conducting received signal path detection for all of the sums produced by the summing means and selecting one of the sums based on the result of the detection and that of establishing a priority sequence regarding the order in which the sums produced by the summing means are to be used for path detection and successively selecting one sum from among the sums based on the priority sequence. Further, an arrangement can be adopted in which the path detection processing is repeated when one or both of the number of detected paths and the detected path level does not satisfy the prescribed condition.

In the receiver according to one aspect of the present invention, the summing means comprises at least one multiplier that time-division multiplies the signals from the antennas and the receive weights of the individual antennas generated by the receive weight generating means and a synthesizer that sums the multiplication results for the individual antennas produced by the multiplier.

Since the multiplication of the signals from the antennas and the receive weights of the individual antennas can therefore be done by a relatively small number of multipliers operating in time-division mode, the number of multipliers can be reduced and the size of the circuit decreased.

The at least one multiplier used for the time-division multiplication may be any number of multipliers.

The time-divided multiplication may be carried out in any of various modes.

The receiver of the present invention described in the foregoing can be preferably applied in a CDMA receiver for receiving Wideband-CDMA or other such CDMA spread spectrum signals over the airwaves.

In the CDMA receiver of the present invention, the spread spectrum signals contained in the received signals can be detected (e.g., dispread) for every path based on the received signal path detection result.

The receiver of the present invention described in the foregoing can be preferably applied in a CDMA base station for receiving Wideband-CDMA or other such CDMA spread spectrum signals over the airwaves.

In the CDMA base station of the present invention, the receiver of the foregoing description receives spread spectrum signals from multiple mobile stations (users) that transmit CDMA spread spectrum signals over the airwaves, detects the received signal paths for every mobile station, and detects (e.g., despreads) the spread spectrum signals contained in the received signals for every mobile station and every path based on the detection result.

A base station is generally defined as being capable of wireless communication with multiple mobile stations. The number of mobile stations with which the CDMA base station of this invention can communicate is not particularly limited.

The present invention, by enabling path detection utilizing the configuration and method described in the foregoing, provides a path detector and a path detection method capable of enhancing the received signal path detection accuracy.

Specifically, the path detector of the present invention is configured so that in detecting the paths of signals arriving via multiple paths received by multiple antennas, the paths of the received signals are detected based on sums of the results obtained by multiplying the signals from the antennas and receive weights of the individual antennas.

The path detection method of the present invention is configured so that in detecting the paths of signals arriving via multiple paths received by multiple antennas, the paths of the received signals are detected based on sums of the results obtained by multiplying the signals from the antennas and receive weights of the individual antennas.

The path detection circuit and the path detection method of the present invention are preferable for application to a CDMA receiver, a CDMA base station or the like that receives signals using multiple antennas.

BRIEF EXPLANATION OF THE DRAWINGS

FIG. 4(a) is a diagram for explaining a configuration that uses a multiplier in time-division mode.

DESCRIPTION OF THE PREFERRED EMBODIMENTS

Embodiments of the invention will now be explained with reference to the drawings.

A CDMA base station equipped with a CDMA receiver that is a first embodiment of this invention will be explained first.

Figure 1:
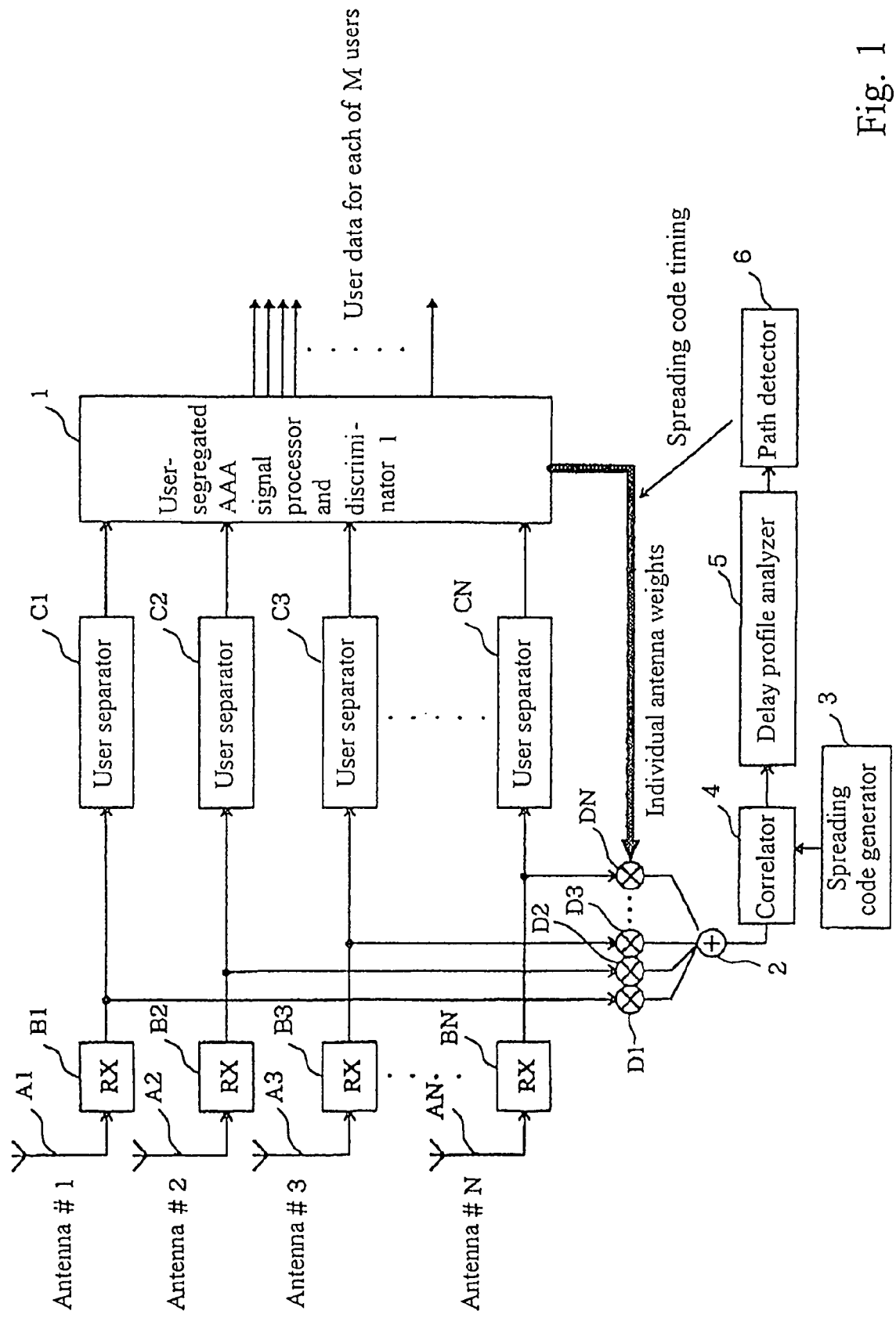
FIG. 1 is a diagram showing the configuration of a receiver with path detection circuit that is an embodiment of the present invention.

FIG. 1 shows the configuration of a receiver with path detection circuit (path detector) used in the CDMA base station with adaptive array antenna of the example that will be explained here.

The illustrated receiver comprises N number of receive paths composed of N number of antennas A1–AN constituting an adaptive array antenna, N number of receiver units (RX) B1–BN each associated with one of the antennas A1–AN, and N number of user separators C1–CN each associated with one of the antennas A1–AN (and one of the receiver units B1–BN). The illustrated receiver also includes a user-segregated AAA signal processor and discriminator 1 common to the N number of receive paths.

The illustrated receiver is further equipped with a path detection circuit composed of N number of complex multipliers D1–DN, a synthesizer 2, spreading code generator 3, correlator 4, delay profile analyzer 5, and path detector 6.

Figure 6:
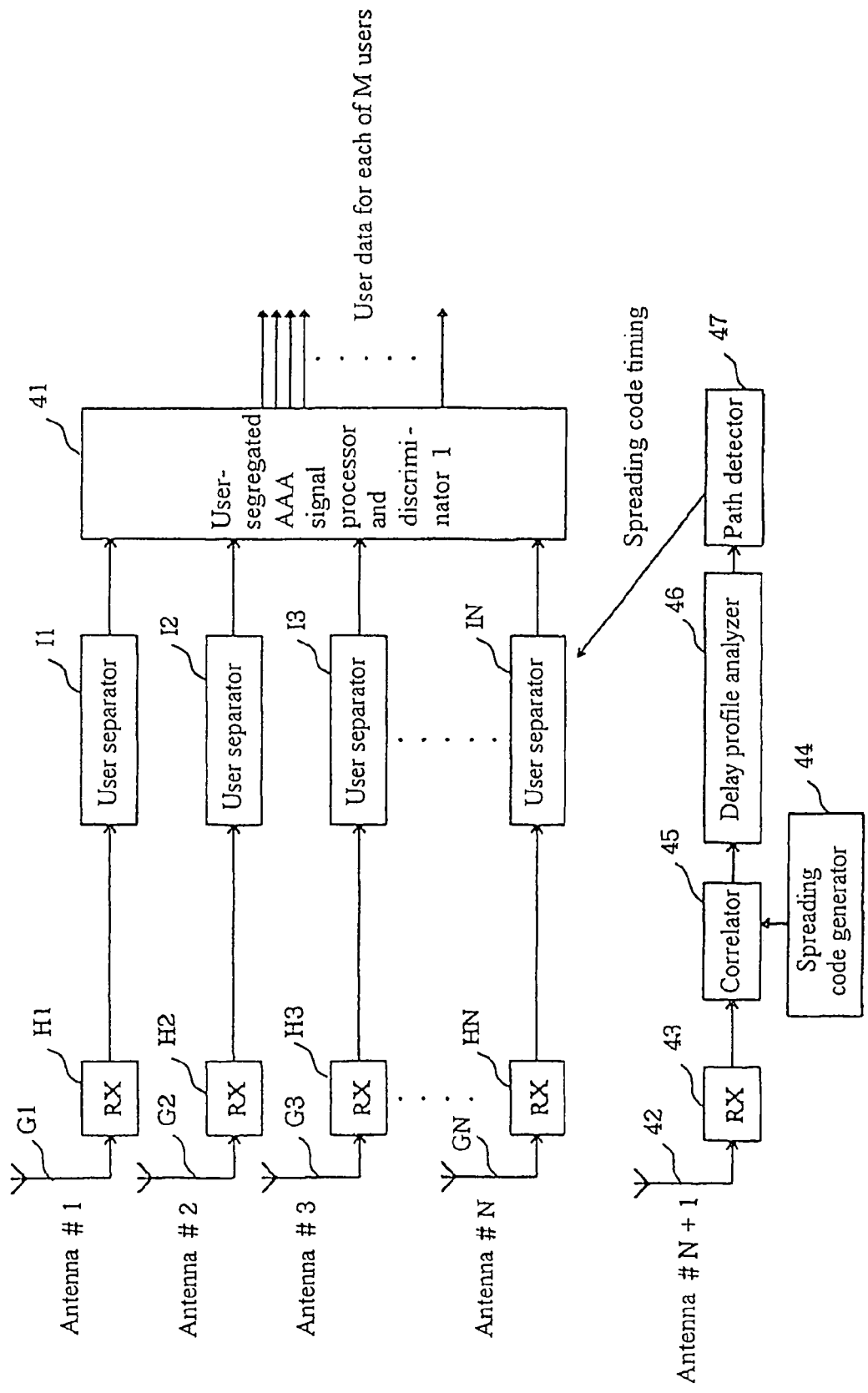
FIG. 6 is a diagram showing the configuration of a conventional receiver including a path detection circuit.

The configuration and operation of the receiver installed in a CDMA base station of this embodiment are, except for the configuration and operation of the path detection circuit, the same as the configuration and operation of the receiver shown in FIG. 6. The portions of the configuration and operation that are the same will therefore not be explained with respect to this embodiment and only the portions thereof that are different will be explained in detail.

As conducted, for example, by the path detection circuit 42–47 between the antenna 42 and the path detector 47 provided in the receiver shown in FIG. 6, in this embodiment, too, correlation acquisition processing using an omnidirectional antenna or an array of sector antennas for obtaining omnidirectionality is conducted in order to ascertain the presence of users (mobile stations with which communication is conducted). The configuration and operation for such processing in this embodiment will not be explained in detail.

While signals are actually processed as complex signals in the receiver of this embodiment, in some case the explanation to follow will, for the sake of simplicity, be made assuming the signals to be real number signals.

Although an adaptive array antenna is applied in the path detection circuit of the receiver of this embodiment, such application of an adaptive array antenna in the path detection circuit of this invention is valid only with respect to users that apply receive processing using an adaptive array antenna (AAA signal processing).

This embodiment is characterized in that the AAA signal processing performed by the user-segregated AAA signal processor and discriminator 1 is applied to the path detection circuit.

Figure 7:
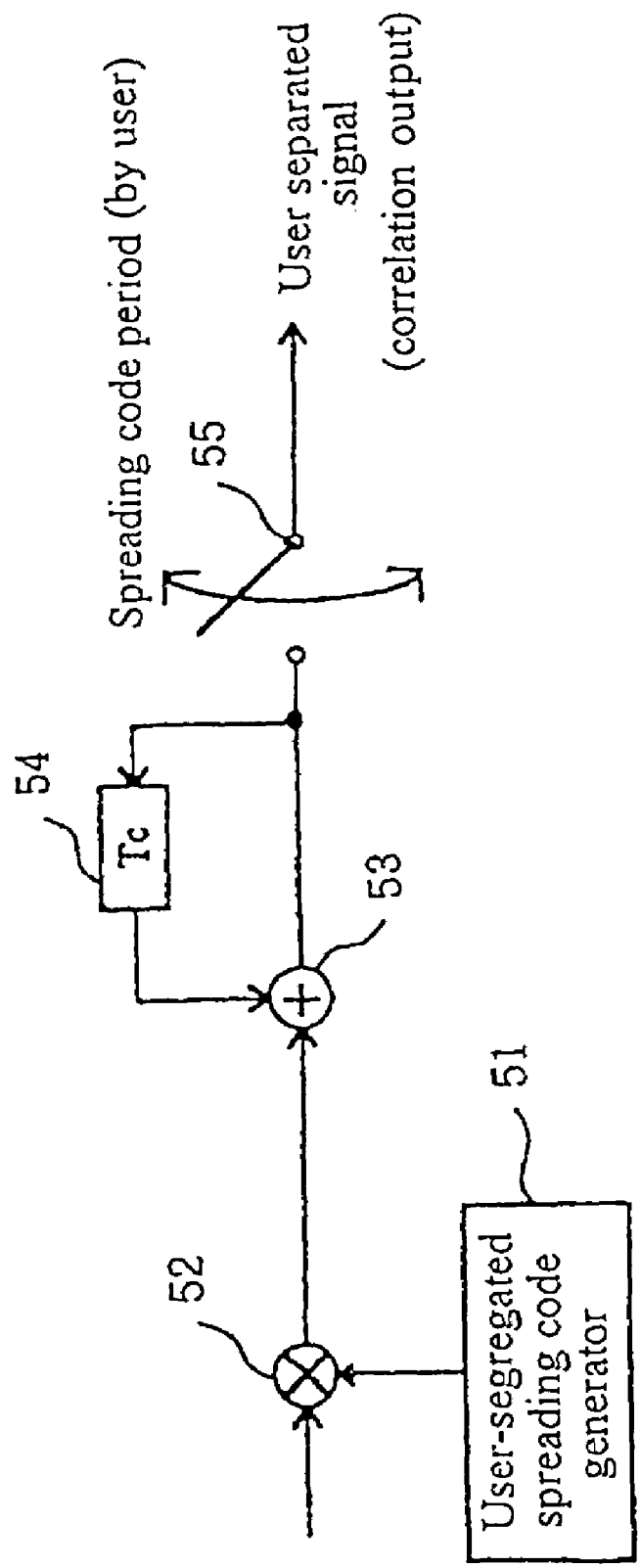
FIG. 7 is a diagram showing the configuration of a correlator of a user separator.
Figure 8:
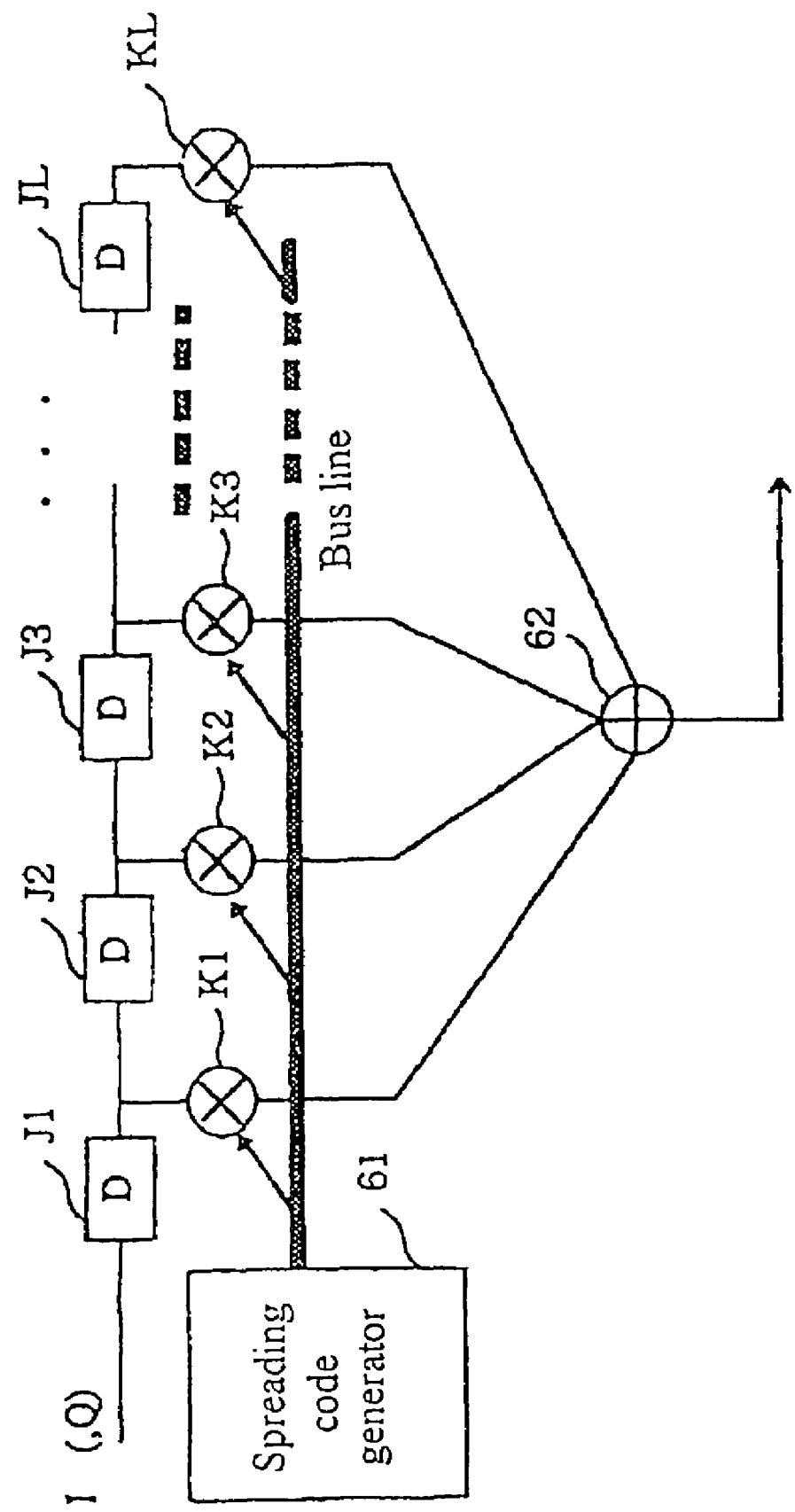
FIG. 8 is a diagram showing the configuration of a correlator (MF).
Figure 9:
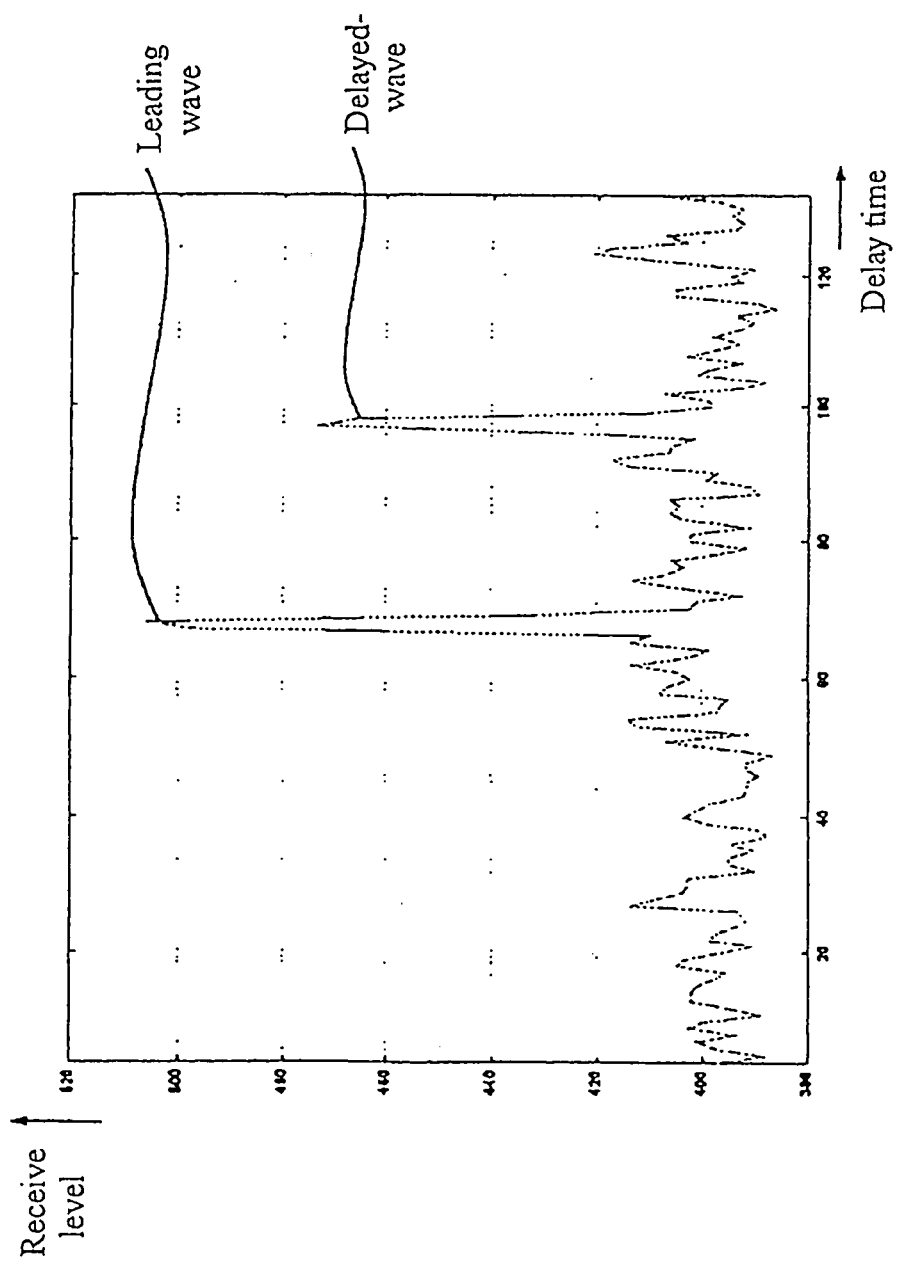
FIG. 9 is a graph showing the output of a correlator (MF).
Figure 10:
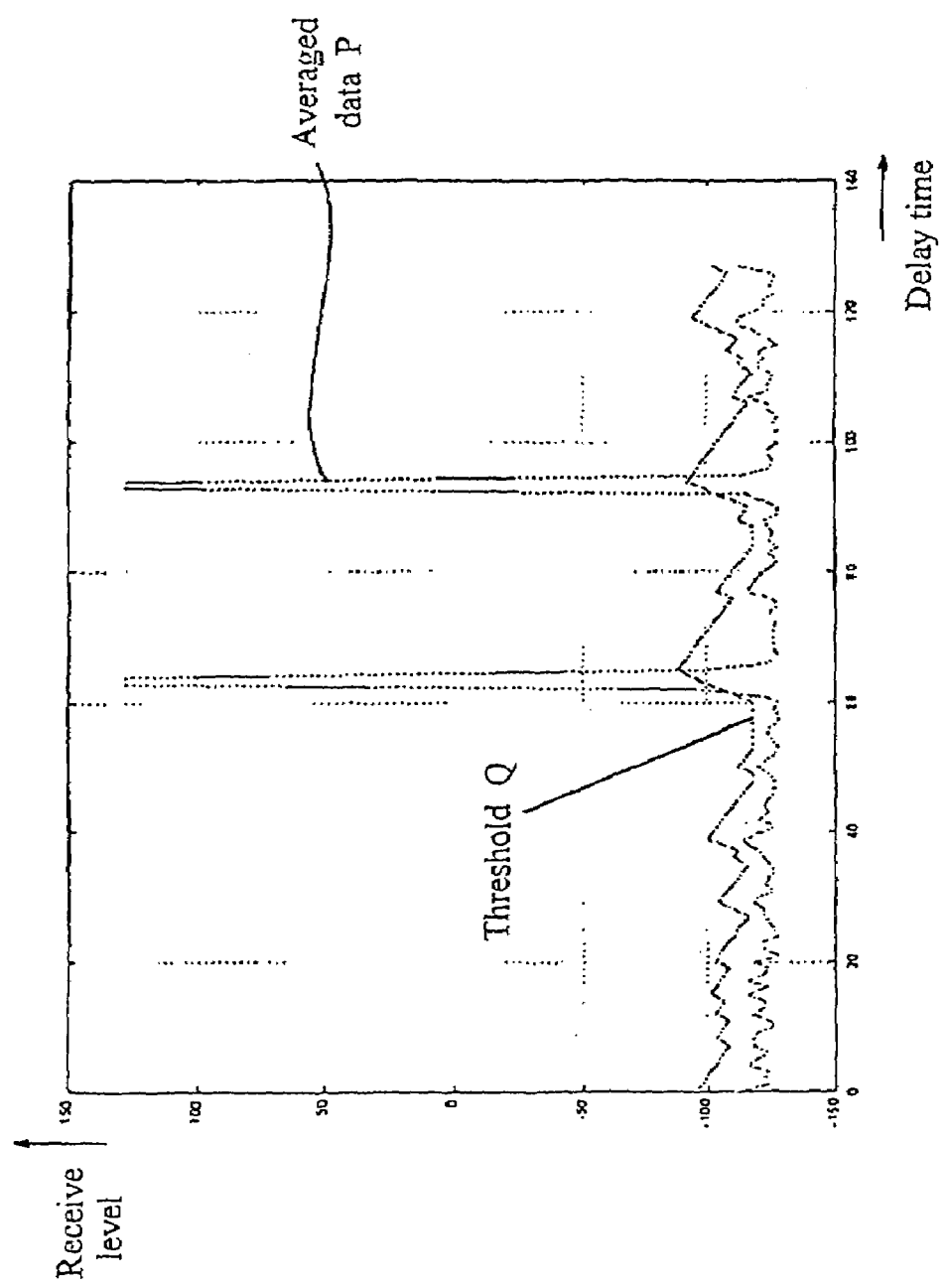
FIG. 10 is a graph showing the averaged output of a transmitter (MF).

In AAA signal processing, as shown for example in FIG. 7, the multiplication of the signals separated by user (despread signals) by the receive weights is generally carried out for every user, path and antenna, and the results of the multiplication are synthesized for each user and path.

As an example using specific numbers, consider the case of using six antennas to receive signals in an environment in which each of four users forms two paths. The number of receive weights to be generated becomes 4×2×6=48. The number of 6-input, 1-ouput synthesizers required in this case is 4×2=8.

The weights are usually calculated using the normalized-least mean square (N-LMS) algorithm. A number of studies have been done for upgrading the reception quality using this algorithm. See "1999 Conference of The Institute of Electronics, Information and Communication Engineers B-5-53," for example. This algorithm will not be discussed in detail in the explanation of this embodiment.

The user-segregated AAA signal processor and discriminator 1 uses an algorithm such as that just mentioned to calculate receive weights for the individual user signals and then outputs to the respective complex multipliers D1–DN the receive weights of the individual antennas A1–AN obtained with respect to the user signals whose delay profiles are to be next analyzed by the path detection circuit.

Figure 2:
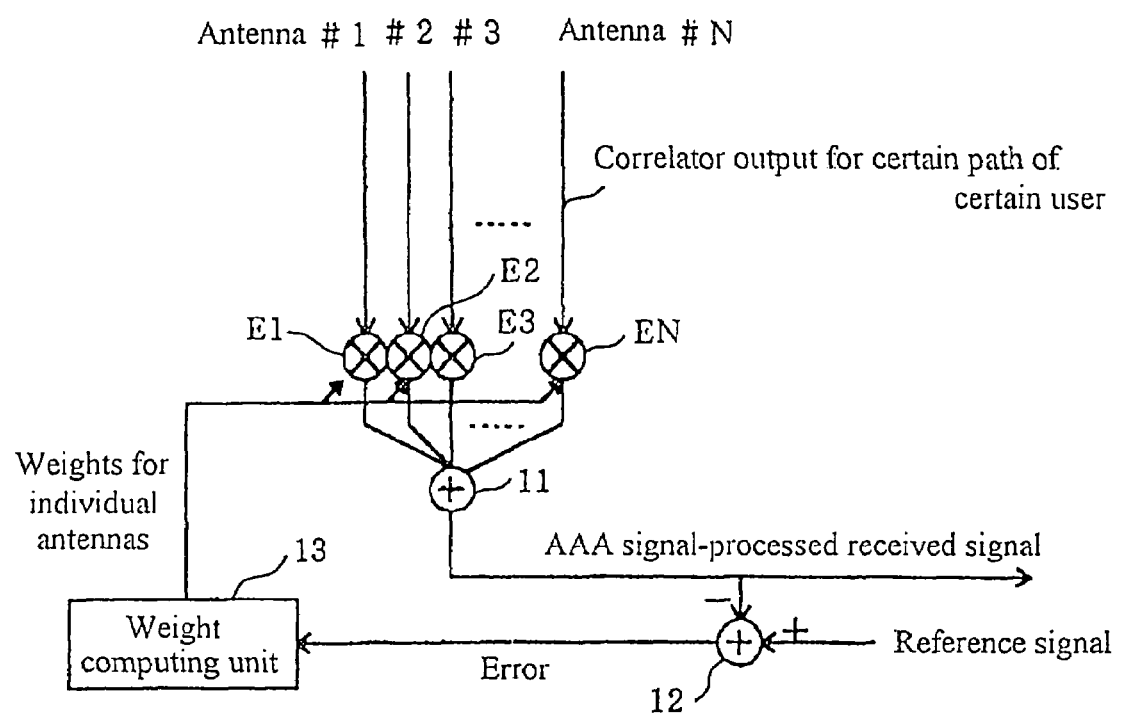
FIG. 2 is a diagram showing the configuration of an AAA signal processor.

FIG. 2 shows an example of the user-segregated AAA signal processor of the user-segregated AAA signal processor and discriminator 1. The user-segregated AAA signal processor comprises N number of complex multipliers E1–EN, a synthesizer 11 for summing the multiplication results, a synthesizer 12 for control, and a weight computing unit 13.

The input signal from each of the antennas A1–AN for a prescribed path of a prescribed user is sent from the associated receiver unit B1–BN to the associated user separator C1–CN and the result of correlation processing by the correlator of the user separator C1–CN is input to an associated one of the complex multipliers E1–EN. The complex multipliers E1–EN are also input with receive weights calculated for the respective antennas A1–AN by the weight computing unit 13 (explained below). Each complex multiplier E1–EN multiples the correlation result input from the associated antenna A1–AN and the receive weight for the associated antenna A1–AN, and sends the multiplication result to the synthesizer 11.

The synthesizer 11 synthesizes the N number of multiplication results received from the N number of complex multipliers E1–EN and outputs the synthesis result to the discriminator as a received signal subjected to signal processing by the adaptive array antenna. The synthesizer 11 also outputs the synthesis result to the synthesizer 12.

A data signal of the aforesaid prescribed user acquired from the discriminator, for example, is also input to the synthesizer 12 as a reference signal.

The synthesizer 12 inverts the output signal from the synthesizer 11 and synthesizes the inverted output signal with the reference signal, thereby outputting to the weight computing unit 13 an error signal that is the result obtained by subtracting the output signal of the synthesizer 11 from the reference signal.

The weight computing unit 13 is constituted as a digital signal processor (DSP), for example. By successive updating or the like, it calculates for the respective antennas A1–AN receive weights that reduce (preferably minimize) the error signal received from the synthesizer 12. The receive weights calculated for the individual antennas A1–AN are output to the complex multipliers E1–EN.

The configuration and operation of the path detection circuit of this embodiment will be explained.

In the path detection circuit of this embodiment, the complex multipliers D1–DN are input with the signals sent from the receiver units B1–BN to the user separators C1–CN.

The complex multipliers D1–DN multiply the signals received from the associated receiver units B1–BN and the receive weights of the associated antennas A1–AN received from the user-segregated AAA signal processor and discriminator 1, and output the multiplication results to the synthesizer 2.

The synthesizer 2 synthesizes the N number of multiplication results received from the N number of complex multipliers D1–DN and outputs the synthesis result to the correlator 4.

Figure 5:
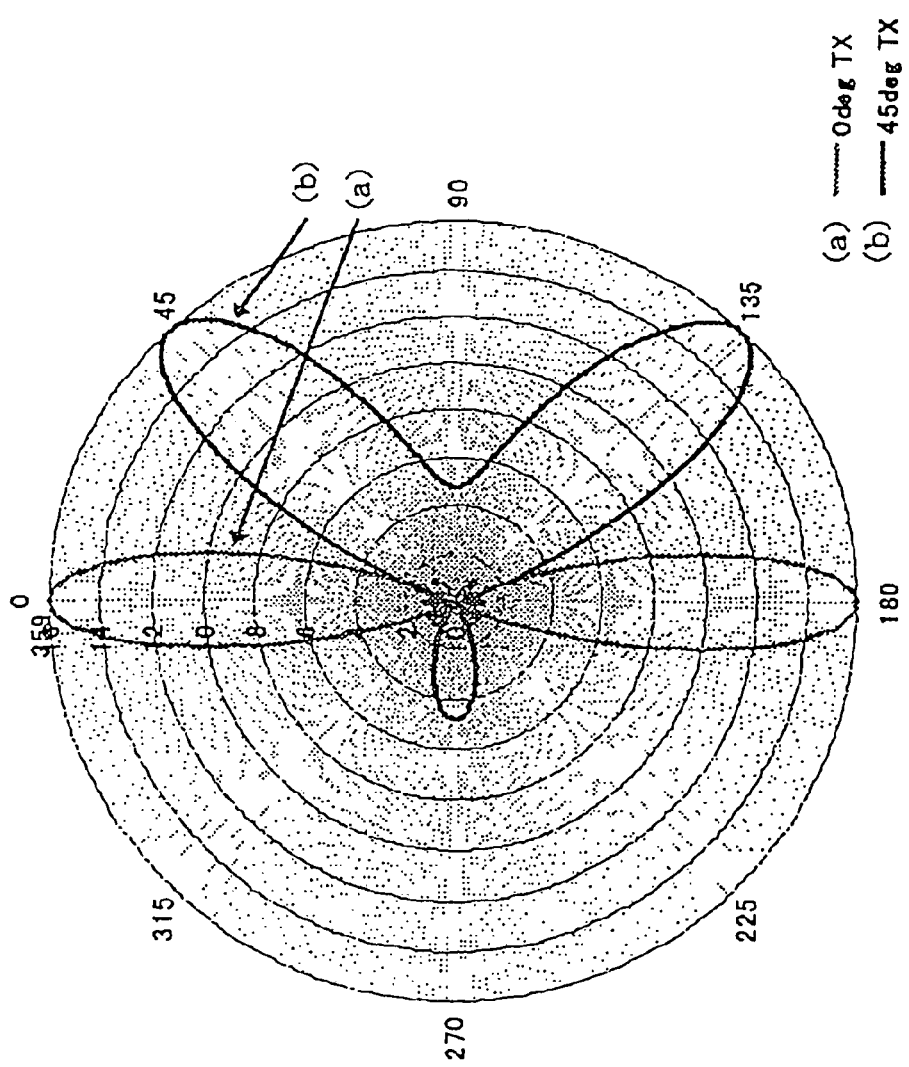
FIG. 5 shows an example of receive directivity patterns of an adaptive array antenna.

The spreading code generator 3, correlator 4, delay profile analyzer 5 and path detector 6 utilize the synthesis result received from synthesizer 2, for example in a manner similar to the path detection circuit shown in FIG. 5, to carry out correlation between the synthesis result and the spreading code, analyze the delay profile obtained by time-averaging the correlation result, and detecting the path of the received signal based on the averaged delay profile.

The combination of the multiplication by the complex multipliers D1–DN and the synthesis by the synthesizer 2 amounts to signal processing equivalent to that by an adaptive array antenna. In other words, the optimum receive directivity obtained with an adaptive array antenna using an algorithm such as N-LMS (e.g., receive directivity that maximizes receive gain in the direction of the desired incoming wave and directs a null in the direction of an undesired incoming wave) is also applied to the path detection circuit.

A conventional path detection circuit such as that shown in FIG. 6 experiences a decrease in path detection accuracy because in the absence of signal processing by an adaptive array antenna the interference in the path detector 47 reaches a level that is not negligible. In contrast, the path detection circuit of this embodiment achieves improved path detection accuracy because the adoption of a detection method that applies signal processing by an adaptive array antenna ensures removal of interference waves at the time of path detection.

Studies conducted by professional associations have taken the position that that even for one and the same user the receive weight sets generated for the individual incoming paths of that user's signal (e.g., 2 sets in the case of 4 antennas and 2 paths) cannot be applied for path detection because they differ from one another. That is, the assumption was that the receive weight generated with respect to the leading wave (direct wave), being a receive weight that removes delayed-waves, would, if used in the path detection circuit, remove the delayed-wave component and make detection of the delayed path impossible. This is contrary to fact.

The fact is that in the operation of an adaptive array antenna, the delayed-wave rarely arrives at an angle differing greatly from that of the leading wave.

Professional association studies etc. to date assume that the angular shift of delayed-waves relative to the leading wave, while varying depending on factors such as the height of the antenna, is around 10 degrees at the largest and about 5 degrees on average. But as can be seen even from a theoretical directivity pattern totally free of degeneration, such as that shown in FIG. 5, the beam does not split at a deviation of around ±5 degrees (i.e., the width of a single beam covers both waves).

The likelihood that, as was feared, use of the receive weight of one or the other of the leading wave or the delayed-wave for path detection will make the detection of the path of the other wave impossible is therefore extremely small.

Therefore, even if, as in this embodiment, signal processing by an adaptive array antenna is applied to path detection and the receive weights are used in common for all paths, it is still actually possible to obtain a large interference elimination effect and thus realize an improvement in path detection accuracy.

As a path detection circuit differing in configuration from that of this embodiment (hereinafter the "Different Configuration"), it is conceivable, for example, to provide N number of correlators (like the correlator 4) equal to the number of antennas A1–AN, as in a receive processing system using an adaptive array antenna, to send the output signals from the receiver units (like the receiver units B1–BN) to the N number of correlators, and to provide as stages following the correlators complex multipliers (like the complex multipliers D1–DN) and a synthesizer (like the synthesizer 2). In this Different Configuration, the N number of correlators correlate the output signals from the receiver units with the spreading codes, the N number of complex multipliers multiply the outputs from the correlators and the receive weights of the individual antennas, the synthesizer synthesizes the N number of multiplication results, a delay profile analyzer (like the delay profile analyzer 5) analyzes a time-averaged delay profile based on the synthesis result, and a path detector (like the path detector 6) detects the received signal based on the averaged delay profile.

As this Different Configuration requires provision of N number of correlators, however, it is larger in physical size than the configuration according to this embodiment. Moreover, the operation of such correlators (MF) is for the purpose of path detection but this purpose cannot be achieved by, as in a receive processing system using an adaptive array antenna or the like, merely multiplying the correlator outputs by the receive weights and obtaining correlations only at the time the correlation peaks become maximum. It is necessary to multiply the correlator outputs by the receive weights and obtain correlation at all times, including times other than the maximum peak points.

Thus, the receiver installed in a CDMA base station of this embodiment adopts a configuration including an adaptive array antenna composed of multiple antennas A1–AN, wherein each of the antennas A1–AN is imparted with a receive weight and weighting/synthesis processing is applied to path detection. Specifically, the signals received using the multiple antennas A1–AN are used to calculate a receive weight for each of the antennas A1–AN, the signals received by the antennas A1–AN and the receive weights calculated for the individual antennas A1–AN are multiplied, and path detection is conducted based on the result of summing the multiple multiplication results. It should be noted that the receive weights of the individual antennas A1–AN are calculated for each user and the receive weights calculated for a given user are used for path detection of that user.

In the receiver of this embodiment, the circuit configuration includes a circuit for signal receive processing that comprises N number of antennas A1–AN that each transmits/receives carrier frequency band signals, N number of receiver units B1–BN that down-convert the outputs (received signals) of the N number of antennas A1–AN to baseband (or, for example, intermediate frequency (IF)) signals, N number of user separators C1–CN that separate (e.g, despread) the outputs of the N number of receiver units B1–BN into individual user signals taken in in accordance with the principle of the CDMA system, and a user-segregated AAA signal processor and discriminator 1 that discriminates data resulting from synthesis of the outputs of the N number of user separators C1–CN by adaptive array antenna signal processing, thereby outputting receive data for each of M number of users.

The receiver of this embodiment further includes a circuit for path detection comprising N number of complex multipliers D1–DN that complex-multiply the outputs of the aforesaid N number of receiver units B1–BN and receive weights for the individual antennas A1–AN calculated by the aforesaid user-segregated AAA signal processor and discriminator 1, a synthesizer 2 that synthesizes the outputs of the N number of complex multipliers D1–DN, a correlator 4 that extracts (despreads) the signal of a desired user from the output of the synthesizer 2, a spreading code generator 3 that outputs the spreading code of the desired user to the correlator 4, a delay profile analyzer 5 that analyzes the output of the correlator 4 to obtain a delay profile, and a path detector 6 that detects a significant incoming wave from the output of the delay profile analyzer 5.

Being so configured, the receiver installed in a CDMA base station of this embodiment calculates receive weights for every user, path and antenna from the signals received by the antennas A1–AN and uses one of the calculated weight sets for path detection to detect the path of the received signal for each user.

Thus by using adaptive array antenna signal processing for path detection, the receiver installed in a CDMA base station of this embodiment achieves improved path detection accuracy relative to the prior art and, by this, enables reduction of the transmission power of mobile stations and the like, which reduction in turn enables enhancement of system capacity. Moreover, since the path detection circuit of the configuration according to this embodiment conducts adaptive array antenna signal processing at a stage prior to the correlator 4, the number of correlators can, as explained earlier, be reduced compared with the case of conducting the signal processing at a stage following the correlator(s).

The N number of antennas A1–AN that receive one and the same user signal arriving via multiple paths in this embodiment correspond to the "multiple antennas" of the present invention.

The capability of the user-segregated AAA signal processor and discriminator 1 to calculate (generate) receive weights of the antennas A1–AN based on the signals it receives from the antennas A1–AN via the receiver units B1–BN and the user separators C1–CN in this embodiment constitutes the "receive weight generating means" of the present invention.

The capability of the N number of complex multipliers D1–DN to multiply the input signals from the antennas A1–AN and the receive weights of the individual antennas A1–AN and of the synthesizer 2 to sum (synthesize) the multiplication results in this embodiment constitutes the "summing means" of the present invention.

The capability of the spreading code generator 3, correlator 4, delay profile analyzer 5 and path detector 6 to detect received signal path based on the result of the summing in this embodiment constitutes the "path detection means" of the present invention.

A CDMA base station equipped with CDMA receiver that is a second embodiment of the present invention will now be explained.

The receiver installed in the CDMA base station of this embodiment is characterized in how the receive weights are imparted from the user-segregated AAA signal processor and discriminator 1 to the complex multipliers D1–DN of the path detection circuit. As the receiver of this embodiment has the same configuration as that of the first embodiment shown in FIG. 1, no detailed explanation of the configuration will be given.

The features that characterize the configuration and operation of this embodiment will now be explained.

As was explained with regard to the first embodiment, in adaptive array antenna signal processing, sets of receive weights can be calculated for the incoming waves arriving via multiple paths (e.g., four sets can be calculated when there are four antennas and three paths). On the other hand, since the path detection circuit operates in the state prior to separation of the signal into the respective paths, only one type of receive weights can be applied to the path detection circuit at any given time point. For example, even when the number of incoming waves arriving via multiple paths (number of paths) is three and there are three sets of weights, only one set of receive weights can be applied to the path detection circuit.

In such a case, it must be decided which of the receive weights among the multiple types of receive weights is to be imparted to the complex multipliers D1–DN at the time of adaptive array antenna processing for path detection. The following decision method is conceivable for deciding the applied weight:

(1) Apply the receive weight obtained with respect to the path that leads in the delay profile (the leading wave path).

(2) Apply the receive weight obtained with respect to the path whose autocorrelation peak has the highest level in the delay profile.

(3) Apply the receive weight obtained with respect to the path whose autocorrelation peak has the lowest level in the delay profile.

(4) Apply the average value of the receive weights obtained for all paths.

The methods (1) to (4) can be expected to produce different effects. For instance, in mobile communications, in which the delay profile of the propagation paths changes from moment to moment, the optimum receive weight can be considered to vary with time.

The receiver of this embodiment deals with this situation by switching among the options (1) to (4) based on the result of path detection. For example, an appropriate receive weight is applied to the path detection circuit in response to change in the delay profile of the propagation paths.

Figure 3:
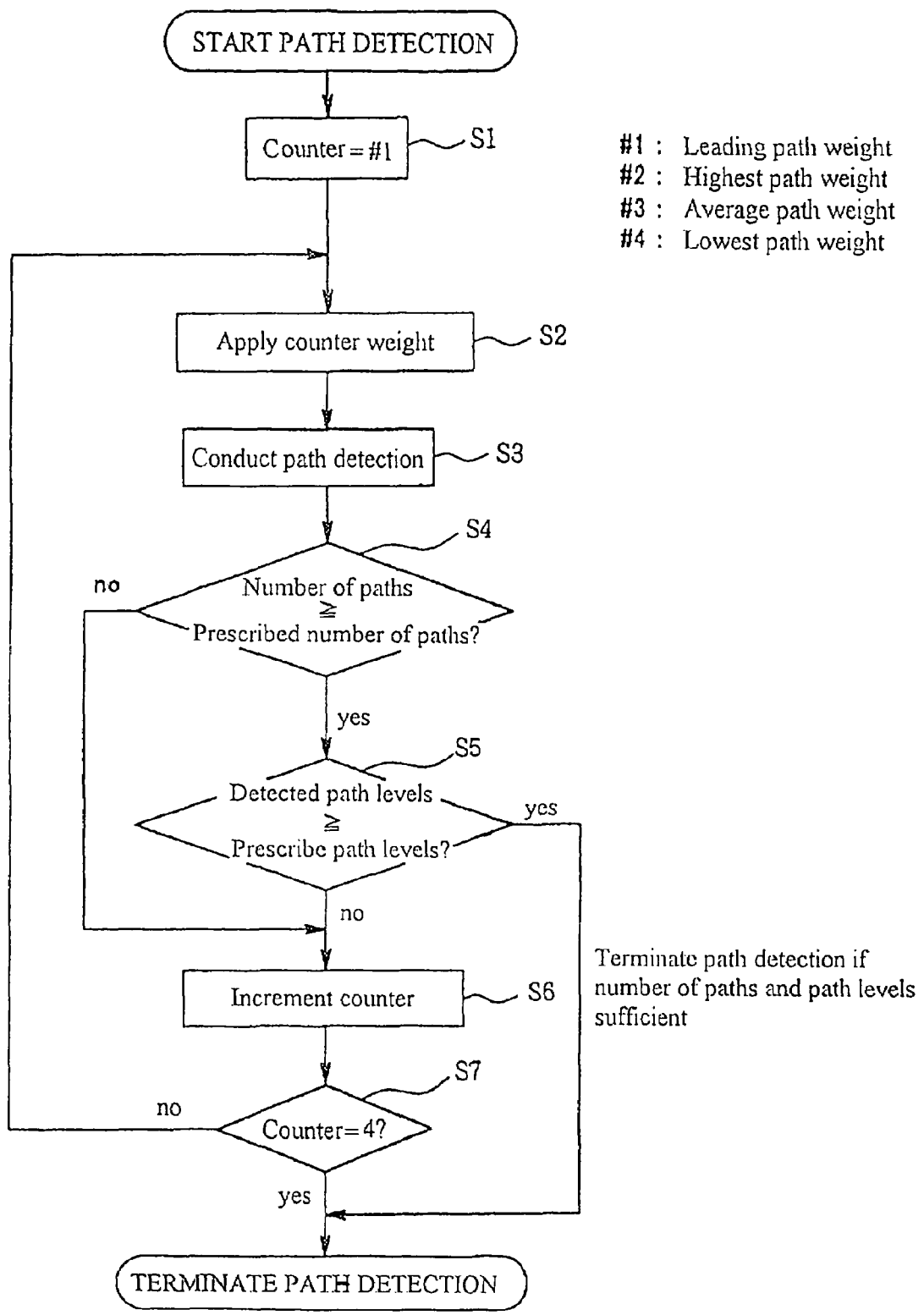
FIG. 3 is a flow chart showing the sequence of processing steps for changing receive weights applied to a path detection circuit.

FIG. 3 is a flow chart showing the sequence of processing steps for changing the receive weight applied to the path detection circuit.

First, the receive weight of the leading path, for example, is initially selected for application (step S1). This receive weight is applied to the path detection circuit (step S2) and path detection processing is performed by the path detection circuit (step S3).

Next, it is discriminated whether the number of paths detected by the path detection processing is equal to or greater than a prescribed threshold (step S4) and checked whether the path level detected by the path detection processing is equal to a predetermined threshold (step 5). When it is found that both the number of detected paths and the detected path level are both equal to or greater than their thresholds, the detected number of paths and the detected path levels are both considered to be sufficient and the path detection processing is terminated.

When the discrimination result (in steps S4 and S5) is that both or either of the number of detected paths and the detected path level is not equal to or greater than its threshold, the applied weight is changed to, for example, the receive weight of the path of highest level (step S6) and that receive weight is applied to the path detection circuit (step S2). Then, similarly to the foregoing, processing for path detection (step S3) and processing for discriminating the number of paths and the path levels are conducted (steps S4 and S5).

Also in the case where the receive weight of the path of highest level is applied, if the number of detected paths and/or the detected path level are not equal to or greater than the prescribed thresholds, the applied weight is again changed (step 6), to the average value of the receive weights of all paths, for example. Processing similar to the foregoing is then conducted (steps S2 to S5).

Also in the case where the average value of the receive weights of all paths is applied, if the number of detected paths and/or the detected path level are not equal to or greater than the prescribed thresholds, the applied weight is again changed (step 6), to the receive weight for the path of lowest level, for example. In this case (step 7), that receive weight is applied, path detection is conducted, and the path detection processing is terminated.

Thus in the receiver of this embodiment, the receive weight applied to the path detection circuit is changed when the number of detected paths and/or the detected path levels obtained as a result of path detection processing fail to reach prescribed thresholds. The path number threshold and the detected path level threshold can be set to any of various values according to the state of system use and the like.

Further, in the receiver of this embodiment, the path detection processing is repeated when, for example, the number of detected paths and the detected path levels do not reach the thresholds.

When the number of detected paths and/or the detected path levels required by the system increase or decrease, the applied weight option that is optimum for the circumstances is preferably selected.

An example of a case may arise is that where, after the path detection processing for various users has been completed, path detection processing is again conducted for users for which path detection processing was already done. While the path detection processing can be conducted by first applying the receive weight of the leading path to the path detection circuit, as shown in FIG. 3, more preferably the path detection processing is conducted by, for example, again applying to the path detection circuit the receive weight previously applied to the users concerned. In this preferred embodiment, identification numbers of the receive weights previously applied to each user can be stored in memory, the identification number associated with the user and stored in memory be retrieved at the time of the next path detection processing for the user, and the receive weight corresponding to the retrieved identification number be applied to the path detection circuit.

In the procedure shown in FIG. 3, the delay profile analysis and path detection processing for a single user is carried out continuously with the type of receive weight being changed until the number of detected paths and/or the detected path levels reach prescribed thresholds. Depending on the state of system use and the like, however, when the number of detected paths and/or the detected path levels obtained for a given user do not reach the prescribed thresholds, it possible instead to conduct delay for profile analysis and/or path detection processing with respect to another user, i.e., to alter the priority of users to be subjected to path detection processing.

Further, the present invention is not limited to the procedure shown in FIG. 3 but can employ any of various other detection processing procedures, insofar as the procedure can ensure completion of the path detection processing by the path detection circuit within a prescribed time period defined in light of, for example, the system use state.

Thus in the receiver installed in a CDMA base station of this embodiment, the type of receive weight the user-segregated AAA signal processor and discriminator 1 imparts to the complex multipliers D1–DN is changed to a different type when the result of path detection does not satisfy prescribed conditions, thereby ensuring that the type of receive weight applied to the path detection circuit provides a sufficient number of detected paths and/or sufficient detected path levels. Moreover, in the receiver of this embodiment, when the path detection result does not satisfy the prescribed conditions, the type of receive weight the user-segregated AAA signal processor and discriminator 1 imparts to the complex multipliers D1–DN is changed and the path detection processing is repeated within a prescribed time period.

Thus in the receiver of this embodiment, at least one type of receive weight among multiple types of receive weights corresponding to multiple types of paths obtained by adaptive array antenna signal processing is used for path detection processing. Specifically, the path detector 6 is made capable of comparing the detected number of paths and a prescribed number of paths and/or is made capable of comparing the levels of the detected paths and a prescribed path level, the path detector 6 and/or the user-segregated AAA signal processor and discriminator 1 select, based on the comparison result, one type of receive weight among the receive weight of the leading path, the receive weight of the highest level path, the average value of all path receive weights and the receive weight of the lowest level path, and the path detection result when the selected weight is applied is supplied to the user separators C1–CN.

In the receiver installed in a CDMA base station of this embodiment, therefore, even when, for example, mobile communication is conducted in which the delay profile of the propagation paths changes from moment to moment to produce a different environment for every user, the type of receive weight applied for path detection can be successively changed to select the type of receive weight considered optimum for each user. Further, this embodiment makes it possible to avoid situations in which the type of receive weight for one incoming wave among incoming waves arriving via multiple paths is fixed and used constantly and, by this, makes it possible to avoid situations in which an incoming wave is constantly lost in the case where, for instance, the incoming wave is lost when a certain type of weight is applied.

In this embodiment, the user-segregated AAA signal processor and discriminator 1 constituting the receive weight generating means of the present invention generates receive weights for every path of the multiple paths contained in the delay profile, the complex multipliers D1–DN and synthesizer 2 constituting the summing means of the present invention sum the receive weights for each of multiple receive weights, and the path detector 6 etc. constituting the path detection means of the present invention detects the paths of the received signals based on the multiple sums.

Still more specifically, the complex multipliers D1–DN and synthesizer 2 constituting the summing means of the present invention calculate the sum of the leading wave path (sum using the leading wave receive weight), the sum of the highest level path (sum using the highest level path receive weight), the sum of the lowest level path (sum using the lowest level path receive weight) and the sum using the average of the receive weights of all paths), the path detector 6 constituting the path detection means of the present invention detects the received signal path for each summing result (each sum), compares the detected number of paths and/or the detected path levels with prescribed conditions and selects one of the sums based on the result of the comparison, and adopts the received signal path detection result based on the selected sum.

A CDMA base station equipped with CDMA receiver that is a third embodiment of the present invention will now be explained.

The receiver installed in the CDMA base station of this embodiment is characterized in the point that the contribution of the complex multipliers to overall physical size is reduced by time-divided use of the complex multipliers for adaptive array antenna signal processing in the path detection circuit. Aside from this feature, the configuration of the receiver of this embodiment is the same as that of the receiver of the first embodiment shown in FIG. 1. Constituent portions which are identical with those of the first embodiment will not be explained again here.

The configuration and operation of the path detection circuit of this embodiment will be explained.

When a complex multiplier complex-multiplies a multiplier coefficient and a multiplicand coefficient it generally has to perform four multiplications because the multiplication coefficient and the multiplicand coefficient both have a real part and an imaginary part.

Therefore, the configuration that achieves maximum reduction of physical size by making time-divided use of the complex multiplier is one that operates the real number multiplier at an operating speed that is four times the total number of antennas A1–AN faster than the operating speed in the configuration shown in FIG. 1 (4×N times faster operating speed). With this configuration, (4×N) multiplications can be done using a single real number multiplier. The physical size of a multiplier is generally large. A 12 bit×12 bit real number multiplier, for example, requires around 20 thousand gates. When the aforesaid configuration that achieves maximum reduction of physical size is adopted in a system equipped with, say, four antennas, the number of gates can be reduced by around 300 thousand.

FIG. 4(a) shows a configuration of the receive weight multiplication and synthesis circuit section when the time-division processing of this embodiment is not applied in a system having a total of four antennas. The circuit section is equipped with four complex multipliers F1–F4 and a synthesizer 21.

In the circuit section of FIG. 4(a), the signals A1[t], A2[t], A3[t], A4[t] each received by one of the four antennas #1–#4 are sent to the complex multipliers F1–F4. Each of the complex multipliers F1–F4 is further input with one of receive weights W1[t], W2[t], W3[t], W4[t] corresponding to the antennas #1–#4.

The symbol t here represents time. Ax[t] and Wx[t] (x=1–4) indicate complex signals, where x is the number of the corresponding antenna #1–#4.

The complex multipliers F1–F4 multiply the input signals A1[t]–A4[t] from the antennas #1–#4 and the receive weights W1[t]–W4[t] and the synthesizer 21 synthesizes the four multiplication results. As a result, the synthesis result output by the synthesizer 21 is (A1[t]*W1[t]+A2[t]*W2[t]+A3[t]*W3[t]+A4[t]*W4[t]).

FIG. 4(b) shows a configuration of the receive weight multiplication and synthesis circuit section when the time-division processing of this embodiment is applied in a system having a total of four antennas. The circuit section is equipped with a multiplexer 31 that converts the parallel signals (four signals) A1[t]–A4[t] received from the four antennas #1–#4 to four-fold faster serial signals (signals of one quarter time width) and outputs the serial signals to a complex multiplier 33, a multiplexer 32 that converts receive weights (parallel signals composed of four receive weight signals) W1[t]–W4[t] to four-fold faster serial signals (signals of one quarter time width) and outputs the serial signals to the complex multiplier 33, the single complex multiplier 33, a synthesizer 34, a delay element 35 and a switch 36.

In the circuit section of FIG. 4(b), the complex multiplier 33 operates by time division, i.e., by operating at four times faster than in the case of FIG. 4(a), the complex multiplier 33 successively outputs the multiplication results for the antennas #1–#4 to the synthesizer 34 in the order of A1[t]*W1[t], A2[t]*W2[t], A3[t]*W3[t], A4[t]*W4[t].

The synthesizer 34 synthesizes the multiplication results received from the complex multiplier 33 and the output of the delay element 35 and outputs the synthesis result. During this operation, the switch 36 closes once for each period of the four antennas #1–#4 (e.g., once every four clock pulses) and opens within the same period. When the opening and closing of the switch 36 are controlled in this manner, the output of the synthesizer 34 is returned to the synthesizer 34 via the delay element 35 when the switch 36 is open and, therefore, the synthesizer 34 and the delay element 35 cumulatively synthesize four multiplication results from the complex multiplier 33 corresponding to the four antennas #1–#4.

When four multiplications results are cumulatively synthesized in this manner, the desired signal can be obtained from the adaptive array antenna, and when the switch 36 opens once every fourth clock pulse, the data of the cumulative synthesis can be made determinate and output via the switch 36. The determinate data are the same as those indicated with respect to FIG. 4(*a*): (A1[t]*W1[t]+A2[t] *W2[t]+A3[t]*W3[ t]+A4[t]*W4[t]).

The data retained by the delay element 35 is reset once every four cycles (e.g., once every four clock pulses) to prevent the retained data from spilling over to an adjacent time region.

Figure 4:
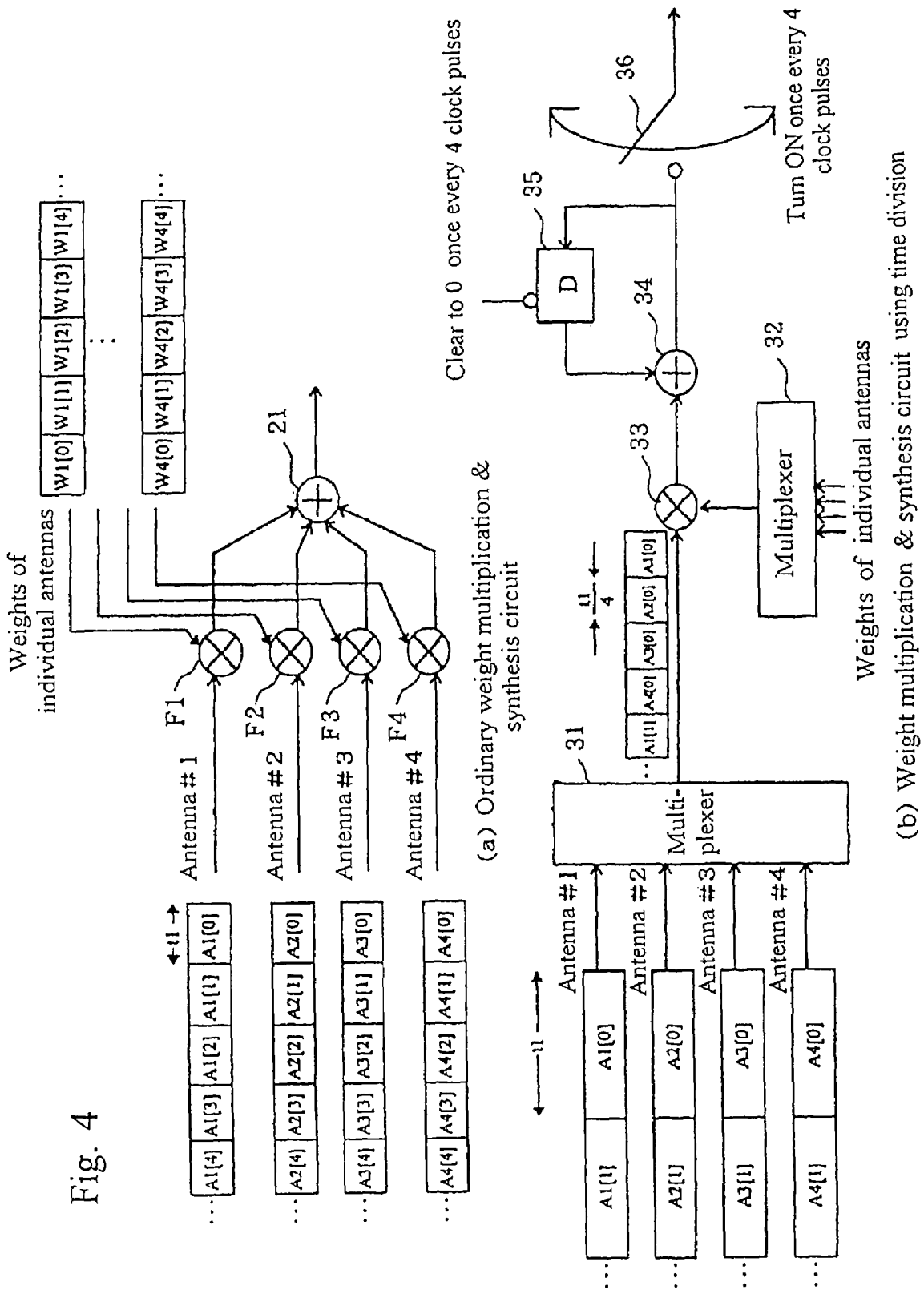
FIG. 4(a) is a diagram for explaining a configuration that does not use multipliers in time-division mode.

In the configuration shown in FIG. 4(*b*), the synthesizer 34 is equipped with the delay element 35 and included in the time-division operation in order to reduce the number input terminals of the synthesizer 34. However, if a multiplexer is provided ahead of the synthesizer 34 for converting the multiplication results output by the complex multiplier 33 from a serial signal to parallel signals (four signals in this example), synthesis can be done using a configuration like that of the synthesizer 21 shown in FIG. 4(*a*).

Thus in the receiver installed in a CDMA base station of this embodiment, the processing for complex-multiplying the signals from the antennas A1–AN and the receive weights of the individual antennas A1–AN is time divided so that the multipliers can be reduced to a small number, such as one or two, that are used for time-division processing. As a result, the physical size of the system can be reduced in comparison with the prior art.

In this embodiment, the complex multiplier 33 that multiplies the signals received from the antennas and the receive weights of the individual antennas by time-division operation constitutes the multiplier of the present invention, and the synthesizer 34 that synthesizes (sums) the multiplication results for the respective antennas produced by the complex multiplier 33 constitutes the synthesizer of the present invention.

As an example of a preferred system for implementing the present invention, there will now be explained a W-CDMA (wideband code division multiple access) base station that sends and receives spread spectrum signals over the airwaves using the W-CDMA system.

W-CDMA has attracted attention as a next-generation mobile communication system. The W-CDMA world standard includes use of the adaptive array antenna as a specification option, making adaptive array antenna utilization possible at the discretion of the operator. Application of the present invention W-CDMA base station makes it possible to structure a cellular telephone network that can reduce the transmission power of the mobile stations and boost capacity.

In one embodiment of the CDMA receiver according to the present invention, the receiver is, for example, configured as described regarding the earlier embodiments, and when the spread spectrum signal is received over the airwaves, the spread spectrum signal contained in the received signal is detected for every path based on the result of received signal path detection.

Further, in one embodiment of the CDMA base station according to the present invention, the CDMA base station is equipped with, for example, a receiver like that described regarding the earlier embodiments, CDMA system spread spectrum signals transmitted from multiple mobile station (users) are received by the receiver, the received signal paths are detected for each mobile station, and the spread spectrum signals contained in the received signal are detected for every mobile station and every path based on the result of the detection result.

Moreover, in one embodiment of the path detector and the detection method according to the present invention, similarly to what was described in the foregoing, detection of the paths of signals arriving via multiple paths and received by multiple antennas is conducted based on the sum of results obtained by multiplying the signals received from the antennas and receive weights of the individual antennas.

The receiver, CDMA receiver, CDMA base station, path detector and path detection method of the present invention are not limited to the arrangements and configurations described in the foregoing but can be modified in various ways.

Moreover, the present invention is not limited to the field of application described in the foregoing but can also be applied in various other fields.

The various types of processing carried out in the receiver, CDMA receiver, CDMA base station, path detector and path detection method of the present invention can, for example, be conducted by physical means equipped with a processor, memory and the like wherein the processor controls the processing by executing a control program stored in a ROM. Otherwise it can be conducted by independent physical circuits constituting functional means for executing the different processing operations.

Moreover, the present invention can be construed as being constituted of the aforesaid control program or of a floppy disk, CD-ROM or other computer-readable recording medium storing the control program, and the processing according to the present invention can be carried out by loading the control program from the recording medium into a computer and executing it by use of the processor.

As explained in the foregoing, the receiver, CDMA receiver, CDMA base station, path detector and path detection method according to the present invention are configured so that when signals arriving via multiple paths are received by multiple antennas, receive weights are generated for each antenna based on the signals coming in from the antennas, the results obtained by multiplying the signals from the antennas and the receive weights of the individual antennas are summed, and the paths of the received signals are detected based on the obtained sum. As a result, received signal path detection accuracy can be enhanced by a simple configuration, thereby providing an improvement in reception quality.

The receiver etc. according to the present invention generate receive weights for each path among multiple paths, calculate the sum of the receive weights of each type among the multiple types of receive weights, and detect the paths of the received signals based on the multiple sums calculated. This is accomplished, for example, by calculating two or more among the sum of the leading wave path, the sum of the highest level path, the sum of the lowest level path and the sum calculated with the average of the receive weights of all paths, detecting the received signal path for each of the summing results (sums), selecting one of the sums based on a comparison of the detected number of paths and/or the detected path levels with prescribed conditions, and detecting the received signal path based on the selected sum. As a result, received signal path detection accuracy can be further enhanced in mobile communications, for example.

Moreover, the receiver etc. according to the present invention are configured to multiply the signals received from the antennas and receive weights generated for the individual antennas by time-division operation of at least one multiplier and to sum the multiplication results for the individual antennas produced by the multiplier. The number of multipliers can therefore be reduced to reduce the physical size of the hardware.

What is claimed is:

1. A receiver that uses multiple antennas to receive signals arriving over multiple paths, the receiver comprising:
   a receive weight generating circuit operable to generate receive weights for individual ones of the antennas based on signals received from the antennas;
   a summing circuit operable to calculate sums of results obtained by multiplying the signals received from the antennas and the receive weights of the individual antennas generated by the receive weight generating circuit; and
   a path detection circuit operable to detect the paths of the received signals based on the sums calculated by the summing circuit;
   wherein the receive weight generating circuit is operable to generate receive weights for each of the multiple paths,
   wherein the summing circuit is operable to calculate a sum for each of the multiple receive weights,
   wherein the path detection circuit is operable to detect the paths of the received signals based on the multiple sums calculated by the summing circuit,
   wherein the summing circuit is operable to calculate two or more members among a sum of a leading wave path, a sum of a highest level path, a sum of a lowest path, and a sum calculated with an average of the receive weights of all paths, and
   wherein the path detection circuit is operable to detect the paths of the received signals for every sum produced by the summing circuit, is operable to select one of the sums produced by the summing circuit based on a comparison of the detected number of paths and the detected path levels with prescribed conditions related thereto, and is operable to detect the received signal paths based on the selected sum.

2. A receiver according to claim 1, wherein the summing circuit comprises:
   at least one multiplier operable to time-division multiply the signals received from the antennas and the receive weights of the individual antennas generated by the receive weight generating circuit; and
   a synthesizer operable to sum the multiplication results for the individual antennas produced by the multiplier.

3. A receiver according to claim 2, wherein the receiver is a CDMA receiver operable to receive CDMA spread spectrum signals over the airwaves, and wherein the receiver is operable to detect the spread spectrum signals contained in the received signals for every path based on the received signal path detection result.

4. A receiver according to claim 1, wherein the receiver is a CDMA receiver operable to receive CDMA spread spectrum signals over airwaves, and wherein the receiver is operable to detect the spread spectrum signals contained in the received signals for every path based on the received signal path detection result.

5. A CDMA base station that uses a receiver to receive spread spectrum signals from multiple mobile stations that transmit CDMA spread spectrum signals over airwaves, detect the received signal paths for every mobile station and detect the spread spectrum signals contained in the received signals for every mobile station and every path based on the detection result, the receiver comprising:
   N number of antennas constituting an adaptive array antenna, N being greater than 1;
   N number of receiver units each associated with one of the antennas;
   N number of user separators each associated with one of the antennas;
   a user-segregated AAA signal processor and discriminator common to N number of receive paths constituted by the N number of antennas, the N number of receiver units and the N number of user separators, and a path detection circuit composed of N number of complex multipliers, a synthesizer, a spreading code generator, a correlator, a delay profile analyzer and a path detector;
   wherein:
   each of the N number of antennas receives wireless signals,
   each of the N number of receiver units converts the input signals from the associated antenna from carrier frequency band signals to baseband signals and outputs the converted signals to the associated user separator,
   each user separator separates the signals from the associated receiver unit into signals of the individual users and individual paths and outputs the separated signals to the user-segregated AAA signal processor and discriminator,
   the user-segregated AAA signal processor and discriminator multiplies the user separated signals received from the user separators and individual user receive weights and acquires a synthesized result of the multiplication results as an adaptive array antenna receive result,
   the user-segregated AAA signal processor and discriminator further outputs to the respective complex multipliers the obtained receive weights of the individual antennas obtained with respect to the user signals whose delay profiles are to be next analyzed by the path detection circuit,
   the complex multipliers of the path detection circuit multiply the signals received from the associated receiver units and the receive weights of the associated antennas received from the user-segregated AAA signal processor and discriminator and output the multiplication results to the synthesizer,
   the synthesizer synthesizes the N number of multiplication results received from the N number of complex multipliers and outputs the synthesis result to the correlator,
   the spreading code generator generates user-specific spreading codes defined for the respective users and outputs the generated spreading code to the correlator,
   the correlator correlates the signal received from the synthesizer with the spreading code received from the spreading code generator and outputs the correlation result to the delay profile analyzer,
   the delay profile analyzer acquires a time-averaged delay profile by averaging the correlation result received from the correlator over time and outputs the averaged delay profile to the path detector, and
   the path detector defines averaged data portions of the averaged delay profile received from the delay profile analyzer that exceed a prescribed threshold as autocorrelation peaks and averaged data portions thereof that do not exceed the prescribed threshold as noise portions, thereby distinguishing between paths and noise to enable detection of path arrival times.

6. A CDMA base station according to claim 5, wherein application of receive weights to the path detection circuit is changed among a method of applying a receive weight obtained with respect to the path that leads in the delay profile, applying a receive weight obtained with respect to the path whose autocorrelation peak has a highest level in the delay profile, applying a receive weight obtained with respect to a path whose autocorrelation peak has a lowest level in the delay profile, and applying an average value of the receive weights obtained for all paths.

7. A CDMA base station according to claim 6, further comprising a receive weight multiplication and synthesis circuit section equipped with a first multiplexer, second multiplexer, complex multiplier, synthesizer, delay element and a switch,
  wherein the first multiplexer converts N number of parallel signals received from the N number of antennas to N-fold faster serial signals and outputs the serial signals to the complex multiplier,
  wherein the second multiplexer receives receive weights corresponding to the individual antennas, converts them to N-fold faster serial signals and outputs the serial signals to the complex multiplier,
  wherein the complex multiplier outputs the result of multiplying the signals received from the first multiplexer and the signals received from the second multiplexer to the synthesizer,
  wherein the synthesizer outputs the result of synthesizing the multiplication result received from the complex multiplier and the output of the delay element, and
  wherein the switch closes once for each period of the N number of antennas, opens within the same period to return the output of the synthesizer to the synthesizer via the delay element when the switch is open, and closes to make determinate and output the data of N number of cumulative syntheses.

8. A CDMA base station according to claim 5, further comprising a receive weight multiplication and synthesis circuit section equipped with a first multiplexer, second multiplexer, complex multiplier, synthesizer, delay element and a switch,
  wherein the first multiplexer converts N number of parallel signals received from the N number of antennas to N-fold faster serial signals and outputs the serial signals to the complex multiplier,
  wherein the second multiplexer receives receive weights corresponding to the individual antennas, converts them to N-fold faster serial signals and outputs the serial signals to the complex multiplier,
  wherein the complex multiplier outputs the result of multiplying the signals received from the first multiplexer and the signals received from the second multiplexer to the synthesizer,
  wherein the synthesizer outputs the result of synthesizing the multiplication result received from the complex multiplier and the output of the delay element, and
  wherein the switch closes once for each period of the N number of antennas, opens within the same period to return the output of the synthesizer to the synthesizer via the delay element when the switch is open, and close determinate and output the data of N number of cumulative syntheses.

* * * * *